Sept. 14, 1965
C. S. OCHS
3,206,025
DETECTING MECHANISM
Filed May 16, 1963
4 Sheets-Sheet 1
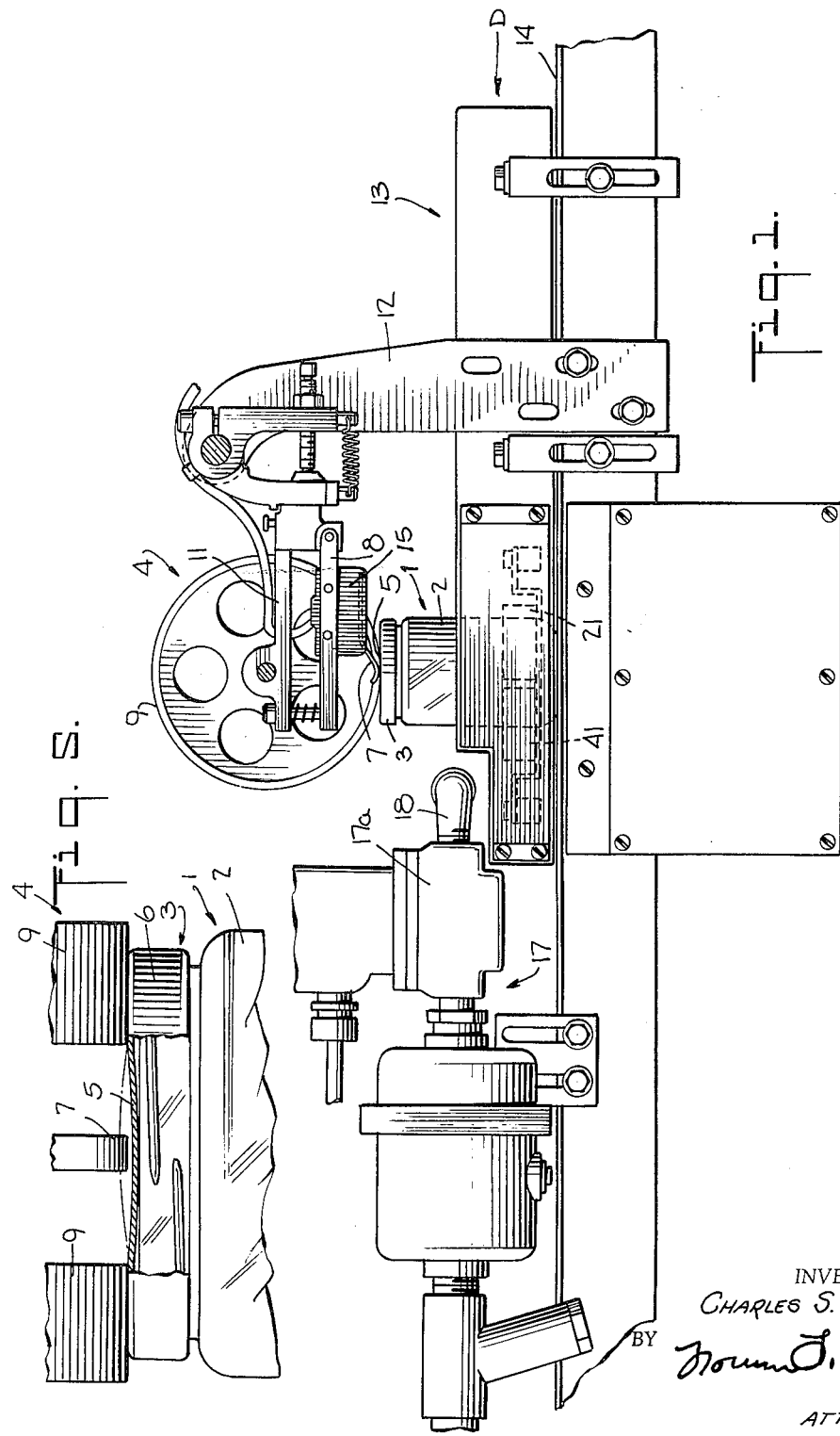
INVENTOR.
CHARLES S. OCHS
BY
ATTORNEY Sept. 14, 1965    C. S. OCHS    3,206,025
DETECTING MECHANISM
Filed May 16, 1963    4 Sheets-Sheet 2
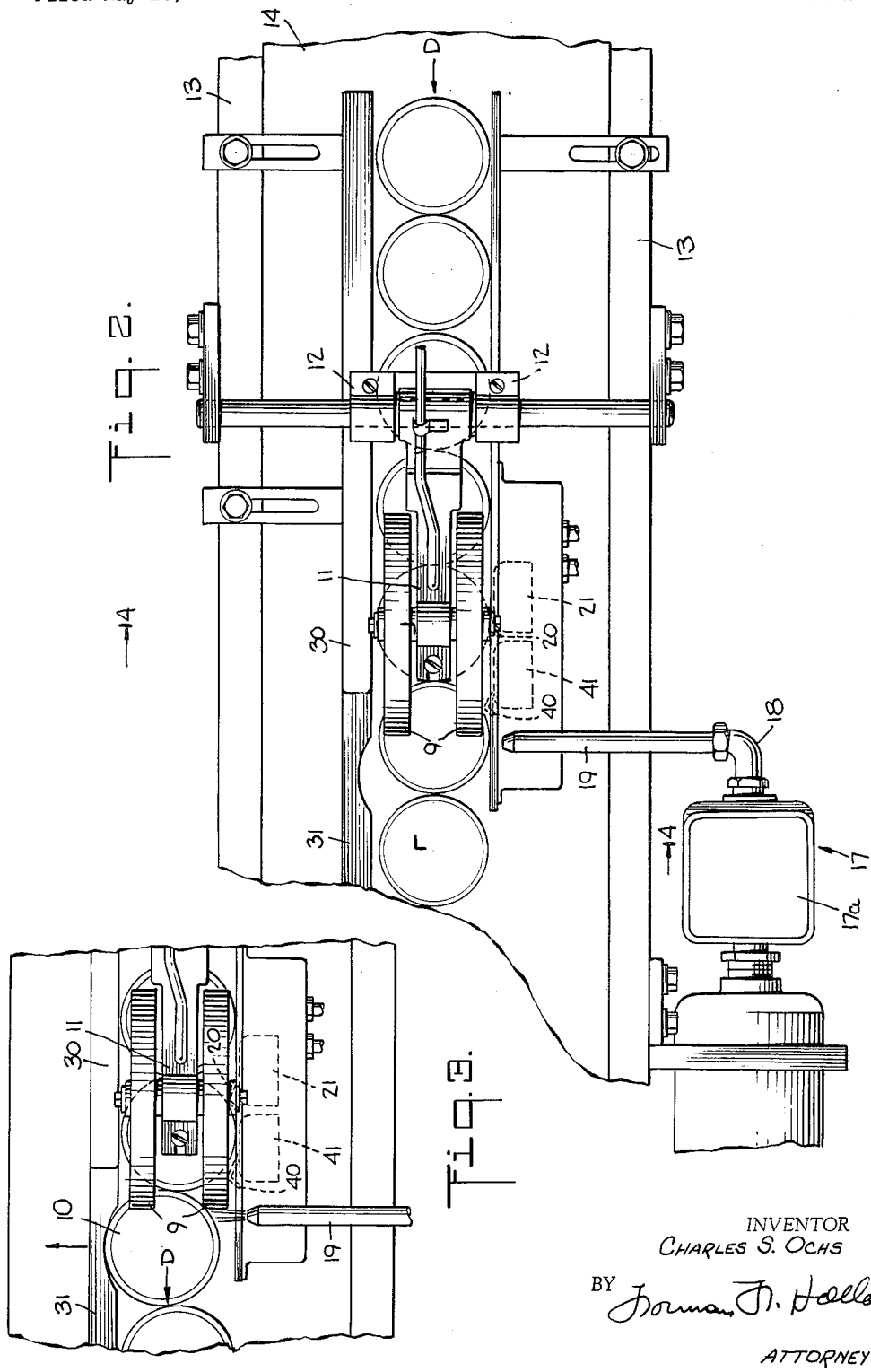
INVENTOR
CHARLES S. OCHS
BY
ATTORNEY Sept. 14, 1965   C. S. OCHS   3,206,025
DETECTING MECHANISM
Filed May 16, 1963   4 Sheets-Sheet 3

INVENTOR.
CHARLES S. OCHS
BY
Norman F. Holland
ATTORNEY

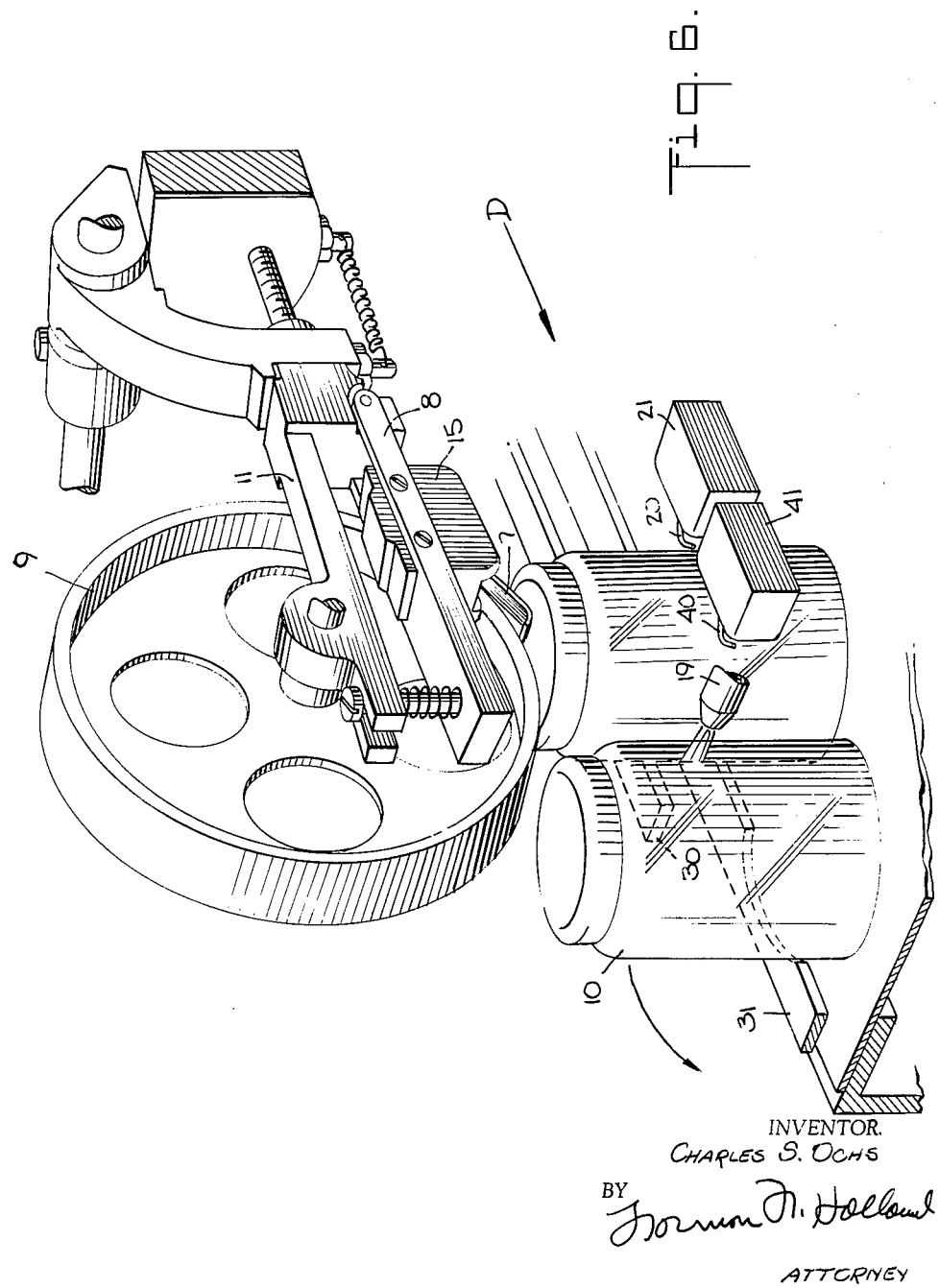

United States Patent Office 3,206,025
Patented Sept. 14, 1965

3,206,025
DETECTING MECHANISM
Charles S. Ochs, Fairfield, Ohio, assignor to Anchor Hocking Glass Corporation, Lancaster, Ohio, a corporation of Delaware
Filed May 16, 1963, Ser. No. 280,797
13 Claims. (Cl. 209—88)

The present invention relates to a mechanism for detecting the presence or absence of a proper vacuum in a sealed package and more particularly to a mechanism for rejecting sealed packages which have insufficient vacuum.

As is well known, there has been an increased use of products which are packaged in conditions approximating a vacuum. Such packages comprise a container and a closure cap mounted thereon. The closure cap has a resilient cover portion adapted to flex downwardly when a sufficient vacuum is present in the container and to be in a raised position when there is no vacuum. With this type of closure cap the consumer may readily ascertain whether or not a container is properly sealed by visual inspection of the cover portion of the cap.

Further, such a resilient cover portion permits improperly sealed containers to be detected by suitable detecting mechanisms before the packages reach the consumer.

Heretofore, several such detecting mechanisms have been used. Generally they comprise means for moving the sealed package beneath a detecting means, such as a feeler finger or some other suitable detecting means. If the resilient cover portion of the closure cap is down so as to indicate that the package is properly sealed, the rejection mechanism is not actuated. However, if the cover portion is not down, such as it would be in a defective package with insufficient vacuum, the detecting means actuate the rejection mechanism which moves the package out of line.

While such detecting mechanisms have been adequate for low speed operations, it has been found that they are not as effective in high speed operations.

Furthermore, prior detecting mechanisms have not been able to operate properly in a conveyor line of packages with back pressure because the packages tend to be pushed out of the break in the side rails which is provided for removal of defective packages.

It has also been found that the packages sometimes move past the detecting means at different speeds so that simple detecting mechanisms are not able to adequately detect and reject defective packages.

In addition it has been found that if the packages moving past the detecting means at high speeds are not evenly spaced, the detection mechanism does not operate properly.

Furthermore, it has also been found that if the packages are being moved past the detecting means at high speed in a "tight line," it is difficult to provide for the proper rejection of the faulty packages.

An object of the present invention is to provide an improved detection mechanism for testing sealed packages to determine whether or not a vacuum is present therein.

Another object of the present invention is the provision of an improved detection mechanism which will operate properly in a conveyor line of packages with back pressure.

Another object of the present invention is to provide a detecting mechanism capable of high speed uninterrupted operation.

Another object of the present invention is the provision of an improved detecting mechanism in which a suitable memory unit is utilized to permit packages to be rejected at a predetermined point beyond the detecting mechanism.

Another object of the present invention is the provision of an improved detecting mechanism in which the packages may be moved past the detecting means in a "tight line."

Another object of the present invention is to provide a mechanism for testing sealed packages as to the presence of vacuum which can be used with existing packaging machines.

Another object of the present invention is the provision of an improved detecting mechanism which will detect defective packages even if the packages are unevenly spaced.

Another object of the present invention is the provision of an improved detecting mechanism which will effectively detect defective packages moving at high speeds even if the packages are unevenly spaced.

Another object of the present invention is the provision of a mechanism for testing sealed packages which is simple and economical to operate.

Another object of the present invention is the provision of an improved storage circuit.

Another object of the present invention is to provide an improved detecting mechanism which can detect and eject faulty packages in a line with back pressure such as occurs when the conveyor is moving faster than the packages.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view of the detecting mechanism of the present invention;

FIG. 2 is a top plan view of the detecting mechanism shown in FIG. 1;

FIG. 3 is a top plan view of the detecting mechanism showing the rejection of a faulty package;

FIG. 5 is an enlarged view partially cut away of the package in the process of being detected for proper vacuum;

FIG. 6 is an enlarged perspective view, partly in section, showing the detection of a faulty package and its rejection.

Figure 4:
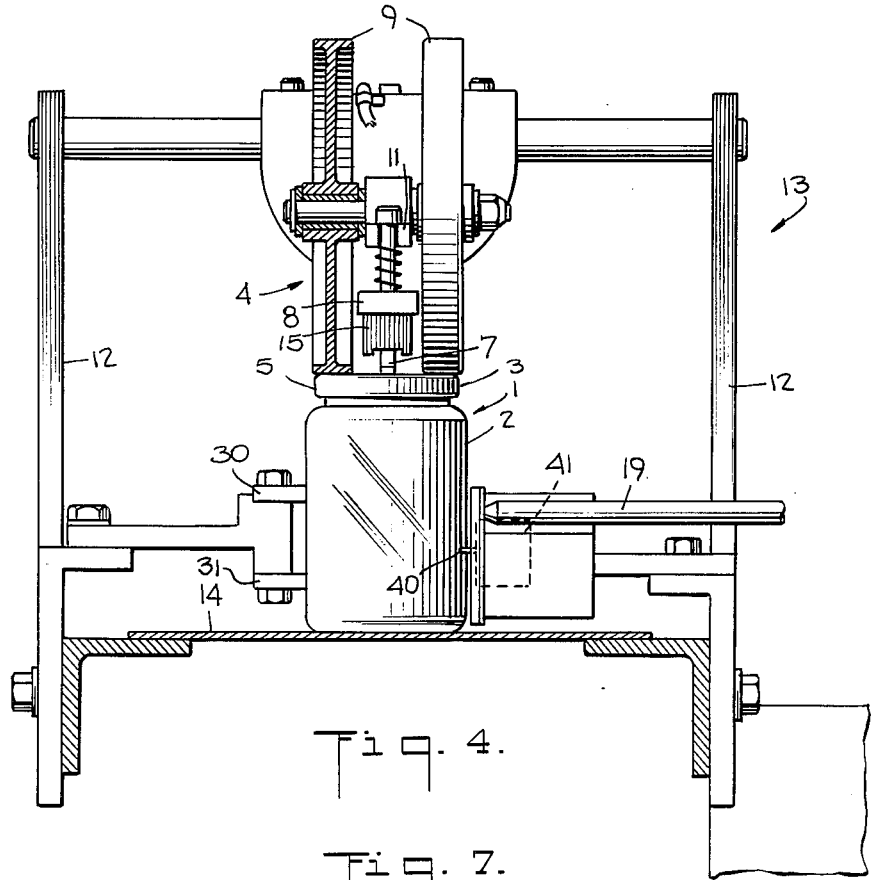
FIG. 4 is a front view, partly in section, of the detecting mechanism, taken along line 4—4 of FIG. 2.

Referring more particularly to FIGS. 1 and 5 of the drawings, a sealed package 1, comprising a container 2 and a closure cap 3, is positioned below a detecting unit, generally identified by the reference numeral 4.

The closure cap 3 (FIG. 5) comprises the usual skirt portion 6 and cover portion 5. The cover portion 5 is flexible and is adapted to flex from a normal position (shown in broken line) indicating an improperly sealed package to a downwardly generally concave position (shown in full lines) indicating a properly sealed package.

The sealed packages 1 are moved below a microswitch 15 which comprises a top feeler finger or detecting arm 7 adapted to overlie the cover portion 5 so that it will sense whether the cover portion is up or down. The microswitch 15 also comprises a contact 24 (FIG. 7) which is adapted to be closed by feeler finger or detecting arm 7 when a faulty package passes therebeneath.

If the sealed package is not defectively sealed the cover portion 5 is down and the package will be moved to the usual packing mechanism. On the other hand, if the sealed package is defective the cover portion 5 is up and the top feeler finger or detecting arm 7 will be moved to close the contact 24 which, in cooperation with contact 23, will energize a storage circuit, as will be described in greater detail hereinafter.

For convenience of description the application will be described in connection with a flexible cover portion which flexes downwardly when vacuum conditions are present in a container and is not flexed downwardly when there is no vacuum. It will be understood that it is within the scope of the present invention to be used in a situation where the cover portion would be in a normally raised position if properly sealed and in the lowered position when improperly sealed. Such a condition arises if a container is provided with an inert gas having a pressure exceeding that of the ambient atmosphere.

As shown in FIGS. 1, 4 and 6 the microswitch 15 is mounted on a pivoted arm 8 between a pair of reference wheels 9 mounted on main arm 11 which is journalled in a pair of standards 12 mounted on a frame 13. The sealed packages 1 are moved beneath the top feeler finger or detecting arm 7 by a conveyor 14, moving in the direction of arrow D.

In moving the packages on the conveyor 14 the packages brush against the pair of rails 30 and 31 which are positioned one above the other. The rail 30 terminates short of the lower rail 31 so that a faulty package can be moved off the conveyor at the rejection station. The lower rail 31 permits packages to move in a line with back pressure since there is no break in the lower rail 31. The faulty packages are removed by being tipped over this lower rail.

The wheels 9 on each side of the top detecting arm 7 act as a reference plane for the feeler finger 7. The wheels contact opposed peripheral edges of the cover portion 5 of the closure cap 3 thereby giving the detecting arm 7 the proper reference level.

In order to insure that the rejection storage circuit is energized only when a package is at the detecting station beneath top detecting arm 7, a side microswitch assembly 21 is mounted along the side of the conveyor 14. Microswitch 21 is provided with side detecting arm or feeler finger 20 which is adapted to be struck by the widest part of the container at the same time that the top detecting arm 7 overlies the flip panel. Thus, when a defective package passes the detecting station, both detecting arms 7 and 20 will be moved simultaneously.

Figure 7:
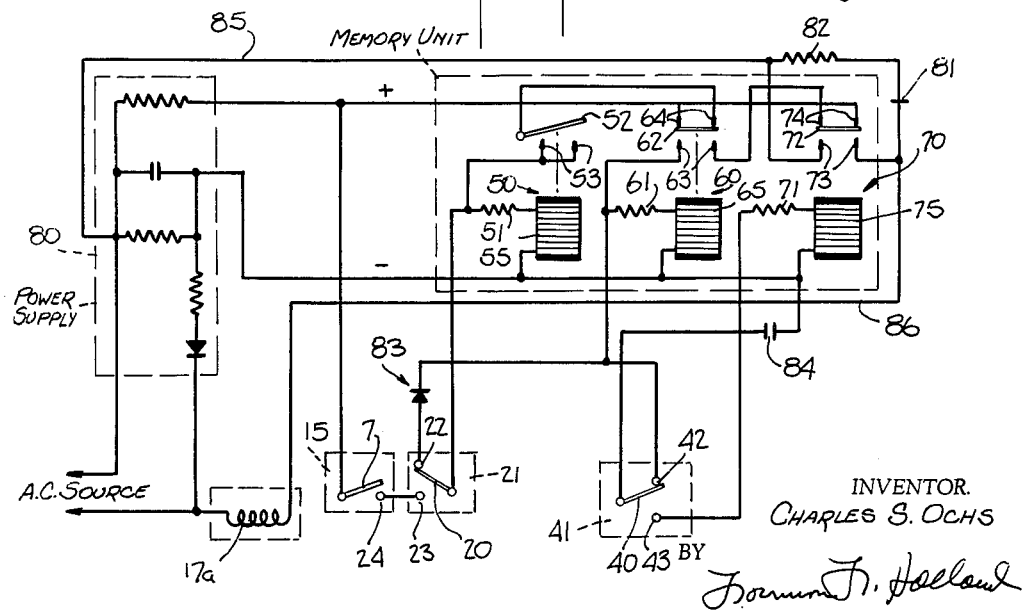
FIG. 7 is a schematic diagram of the electric storage circuit employed with the detection mechanism to actuate the rejection mechanism.

The side microswitch 21 is provided with a pair of contacts 22 and 23 (FIG. 7). The detecting arm 20 normally closes the contact 22 and is movable by a container to a position closing the contact 23. The normally open contact 23 is in series with the contact 24 of the top microswitch 15 so that when a defective package moves both contact arms 7 and 20 a circuit is closed through contacts 24 and 23.

When a package moves to the detecting station, it will move the detecting arm 20 of side microswitch 21 from a position where it closes contact 22 to a position where it closes the contact 23. At the same time, if the package is faulty, i.e. the cover portion 5 is up, the detecting arm 7 will also be moved to close the contact 24 so that a storage circuit (described hereinafter) is energized. Since the side detecting arm 20 is operative only when the widest part of the side walls of the sealed package 1 are beneath the top detecting arm 7, the deflection of the top detecting arm 7 by the upper corner of the cap 3 will not act to energize the storage circuit.

After a defective package moves past the two detecting arms 7 and 20, the package 1 moves past a release side microswitch 41 having a release feeler finger or detecting arm 40 and a pair of contacts 42 and 43. The release detecting arm 40 is movable from a position (FIG. 7) normally closing contact 42 to a position closing the normally open contact 43 in order to initiate the rejecting mechanism. If the package is not defective, then the movement of the release detecting arm to the pulsing position is ineffective. However, if a defective package has been sensed by detecting arms 7 and 20 and is stored by the storage circuit, then the release detecting arm 40 will actuate the rejecting mechanism which moves the package out of line.

The rejection mechanism comprises a compressed air assembly 17, including a solenoid controlled valve 17a from which an air tube 18 extends. Power to operate the valve 17a is obtained from a power supply 80 through leads 85 and 86. The air tube 18 is provided with a nozzle 19 and is positioned in front of the release detecting arm 40. Thus when a defective package 10 is sensed by the detecting arms 7 and 20 and the valve 17a is energized by release detecting arm 40, as will be described in greater detail hereinbelow, the compressed air assembly 17 is actuated to eject air from the nozzle 19 against the defective package 10 (FIGS. 3 and 6) to move the defective package 10 out of line over the lower rail 31.

The electrical circuit of the present invention is shown diagrammatically in FIG. 7 and comprises a storage unit having a control relay 50, a storage relay 60 and rejecting relay 70. Each relay 50, 60 and 70 is provided with a coil 55, 65 and 75, respectively, protective resistances 51, 61 and 71 and armatures 52, 62 and 72. Control relay 50 has contacts 53 while storage relay 60 and rejecting relay 70 have contacts 63–64 and 73–74, respectively, with armatures 62 and 72, respectively, adapted to move between contacts 63–64 and 73–74. Contacts 73 of rejecting relay 70 are in circuit with leads 85 and 86 and are adapted to cause power to be fed to coil 17a when contacts 73 are closed by the energization of rejecting relay 70.

The storage unit is in circuit with the power supply 80 which is connected to an A.C. source and which rectifies the A.C. current by any suitable rectifying mechanism and supplies D.C. power to the storage unit and the other parts of the circuit.

The control relay 50 is in circuit with top microswitch 15 and first side microswitch 21 and is adapted to move its armature 52 from a normal position wherein contacts 53 are open to a contact closing position when the control relay 50 is energized by closing detecting arms 7 and 20. The storage relay 60 and the rejecting relay 70 are adapted to move armatures 62 and 72, respectively, from a position normally closing the contacts 64 and 74, respectively, to a position closing the contacts 63 and 73, respectively, when the relays are energized.

The storage circuit also includes the usual contact-protecting capacitor 81 and resistance 82 and a diode 83 is in circuit with the normally closed contact 22 of the microswitch 21 to prevent feedback.

A capacitor 84 is in series with coil 75 of the rejecting relay 70 and the normally closed contact 42 of release microswitch 41 and is adapted to first store a rejecting signal and thereafter release the signal when the reject detecting arm 40 is moved by a package to energize rejecting relay 70 causing contacts 73 to close thus permitting power to be fed to the air valve 17a to operate it.

When a faulty package is detected, the top detecting arm 7 is moved by the cover portion 5 (which is up) to close the contact 24 of microswitch 15 and the side detecting arm 20 is simultaneously moved by the package to close the contact 23 of microswitch 21. Power is fed to the coil 55 of control relay 50 which is momentarily energized and pulls armature 52 in to close contacts 53. As soon as control relay 50 closes, power is fed through the normally closed contacts 64 of the storage relay 60 and the contact 53 of the control relay 50 to the coil 55 of the control relay 50 so that the control relay 50 remains closed even after the top contact arm 7 and first side contact arms 20 open.

After the container moves by, the top detecting arm 7 moves to its normally open position and the side detecting arm 20 then returns to the normal position closing contact 22. Power is fed through the normally closed contacts 64 of the storage relay 60, through contacts 53 of the control relay 50, the contact 22 of the side microswitch 21 and through the diode 83 to the coil 65 of the storage relay 60 thereby energizing storage relay 60 and pulling its armature 62 in to open contacts 64 and close contacts 63.

At this point the capacitor 84 is charged and the charge is stored until release detecting arm 40 is actuated.

When contacts 64 of the storage relay 60 are opened, the circuit to the coil 55 of control relay 50 is broken and control relay 50 is de-energized so that contacts 53 open and it is ready to receive a new signal from another defective package. As pointed out above the diode prevents feed-back from the relays 60 and 70 which would reactuate the control relay 50.

The storage relay 60 is held in (i.e. armature 62 closing contacts 63) by power from the contacts 74 of the rejecting relay 70 and the contacts 63 of the storage relay 60 to the coil 65 of the storage relay 60. Thus the memory of the first defective package is stored in storage relay 60.

When the defective package strikes release detecting arm 40 of the release microswitch 41 the charge in the capacitor 84 is released to energize the coil 75 of the rejecting relay 70. This will pull armature 72 in to close contacts 73 and cause power to be fed from power supply 80 to coil 17a of air valve 17 through leads 85 and 86.

When rejecting relay 70 is energized, power through contacts 74 to the storage relay 60 is interrupted and the storage relay 60 returns to the normal position and is ready to operate again.

The invention described is designed to store only two packages, but it will be obvious to anyone familiar with electrical circuits that the storage capacity could be increased to any desired number of packages by adding a corresponding number of relays and side switches.

It will be understood that any well known electrical contacts, proximity detectors and other sensing devices may be substituted for the sensing switches in this circuit without departing from the invention.

In operation the conveyor 14 positions sealed packages beneath the detecting unit 4 having a top switch 15 for determining the absence of vacuum within the package and also having a side switch 21. If a package is defectively sealed, the top and side switches actuate an electrical circuit which includes a storage unit as described above.

As the defectively sealed package is moved by the conveyor it will come into contact with a release detecting arm 40 of the second side switch 41 which operates through the electrical circuit described above to actuate a rejection mechanism such as an air valve 17 which directs a stream of air sufficient to tip the defectively sealed package over the lower rail 31. The storage unit described above delays the rejection of a defective package until the package passes the detection mechanism so that the defective package can be tipped over the lower rail 31.

Should the packages be unevenly spaced or the operation of the machine be temporarily stopped after a defectively sealed package has been detected, the storage relay of the electrical circuit described above will retain the storage of the defective package until the defective package actuates the release detecting arm.

Should consecutive closely spaced packages as in a "tight line" be defectively sealed, the first package will be detected as described above. As the first package moves to the rejection station, the next package is positioned under the detecting unit and, if defective, will actuate the electrical circuit and rejection mechanism as described above.

It will thus be seen that with this structure an improved low vacuum detecting mechanism is provided which is capable of uninterrupted high speed operation whether the packages are in a "tight line" or unevenly spaced and even when the packages are moving at unequal speeds. Furthermore, the present invention provides a detection mechanism which will operate in a line of packages with back pressure. The present invention also provides an improved storage unit which will permit defective packages and the like to be rejected at a point beyond the detecting station and which is simple to use and requires little maintenance.

In addition, the present invention also permits defective packages to be removed by tipping them over a low rail (i.e. rail 31 in the drawings) which was not heretofore possible with detection mechanism of the prior art.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A defective article detecting mechanism comprising means for detecting defective articles, means for rejecting said defective articles in a path, means for moving articles relative to said detecting means to permit defective articles to actuate said detecting means, storage means activatable by said detecting means for storing an electric signal, means for releasing said signal from said storage means to actuate said rejecting means to reject a defective article, said releasing means being in advance of said detecting means in the direction of said article path and responsive to articles moving relative thereto to actuate said rejecting means.

2. A defective article detecting mechanism comprising means for detecting defective articles, means for rejecting defective articles, said rejecting means being in circuit with a source of electric power, means for normally interrupting said circuit, means for moving articles in a path past said detecting means to permit defective articles to actuate said detecting means, storage means activatable by said detecting means for storing an electric signal, and means for releasing said signal from said storage means to close the circuit between said source of power and said rejecting means thereby energizing said rejecting means to reject a defective article said releasing means being in advance of said detecting means in the direction of said artcle path and responsive to articles moving relative thereto to actuate said rejecting means.

3. A defective article detecting mechanism comprising means for detecting defective articles, means for rejecting defective articles, said rejecting means being in circuit with a source of electric power, means for normally interrupting said circuit, means for moving articles in a path past said detecting means to permit defective articles to actuate said detecting means, a capacitor adapted to be charged by said detecting means for storing an electric signal, and means for releasing said charge from said capacitor to close the circuit between said source of power and said rejecting means thereby energizing said rejecting means to reject a defective article said releasing means being in advance of said detecting means in the direction of said article path and responsive to articles moving relative thereto to actuate said rejecting means.

4. A defective article detecting mechanism comprising means for detecting defective articles, means for rejecting defective articles, said rejecting means being in circuit with a source of electric power, means for normally interrupting said circuit, means for moving said articles in a path past said detecting means to permit defective articles to actuate said detecting means, a storage relay adapted to be energized by said detecting means, a capacitor adapted to be charged responsive to said storage relay, and means for releasing said charge from said capacitor to close the circuit between said source of power and said rejecting means thereby energizing said rejecting means to reject a defective article said releasing means being in advance of said detecting means in the direction of said article path and responsive to articles moving relative thereto to actuate said rejecting means.

5. A defective article detecting mechanism comprising means for detecting defective articles, means for rejecting defective articles, said rejecting means being in circuit with a source of electric power, a rejecting relay having a contact in circuit with said rejecting means and said power source, said contact being normally open to interrupt said circuit, means for moving articles in a path past said detecting means to permit defective articles to actuate said detecting means, a storage relay adapted to be energized by said detecting means, a capacitor in circuit with said rejecting relay adapted to be charged responsive to said storage relay, and means for releasing said charge from said capacitor to cause said rejecting relay to be energized to close its normally open contact and close the circuit between said rejecting means and said source of power thereby energizing said rejecting means to reject a defective article said releasing means being in advance of said detecting means in the direction of said article path and responsive to articles moving relative thereto to actuate said rejecting means.

6. A defective article detecting mechanism comprising at least one detecting arm for detecting defective articles, means for rejecting defective articles, said rejecting means being in circuit with a source of electric power, a rejecting relay having a contact in circuit with said rejecting means and said power source, said contact being normally open to interrupt said circuit, means for moving articles in a path past said detecting arm to permit defective articles to actuate said detecting arm, a storage relay adapted to be energized by said detecting arm, a capacitor in circuit with said rejecting relay adapted to be charged responsive to said storage relay, and means for releasing said charge from said capacitor to cause said rejecting relay to be energized to close its normally open contact and close the circuit between the rejecting means and said source of power thereby energizing the rejecting means to reject a defective package said releasing means being in advance of said detecting arm in the direction of said article path and responsive to articles moving relative thereto to actuate said rejecting means.

7. A defective article detecting mechanism comprising at least one detecting arm for detecting defective articles, means for rejecting defective articles, said rejecting means being in circuit with a source of electric power, a rejecting relay having a contact in circuit with said rejecting means, said contact being normally open to interrupt said circuit, means for moving articles in a path past said detecting arm to permit defective articles to actuate said detecting arm, a storage relay adapted to be energized by said detecting arm, a capacitor in circuit with said rejecting relay and adapted to be charged responsive to said storage relay, a releasing contact arm responsive to a defective article passing thereby to cause said capacitor to release its charge to energize said rejecting relay and close its normally open contact and to close the circuit between the rejecting means and the source of power thereby energizing the rejecting means to reject a defective article said releasing contact arm being in advance of said first mentioned detecting arm in the direction of said article path.

8. A defective article detecting mechanism comprising at least one detecting arm for detecting defective articles, means for rejecting defective articles, said rejecting means being in circuit with a source of electric power, a rejecting relay having a contact in circuit with said rejecting means, said contact being normally open to interrupt said circuit, means for moving articles in a path past said detecting arm to permit defective articles to actuate said detecting arm, a control relay adapted to be energized by said detecting arm, a storage relay adapted to be energized by said control relay, a capacitor in circuit with said rejecting relay and adapted to be charged responsive to said storage relay, a release detecting arm responsive to a defective article passing thereby to cause said capacitor to release its charge to energize said rejecting relay and close its normally open contact and to close the circuit between the rejecting means and the source of power thereby energizing the rejecting means to reject a defective article said release detecting arm being in advance of said first mentioned detecting arm in the direction of said article path.

9. A defective article detecting mechanism comprising at least one detecting arm for detecting defective articles, means for rejecting defective articles, said rejecting means being in circuit with a source of electric power, a rejecting relay having a contact in circuit with said rejecting means, said contact being normally open to interrupt said circuit, means for moving articles in a path past said detecting arm to permit defective articles to actuate said detecting arm, a control relay adapted to be energized by said detecting arm, a storage relay adapted to be energized by said control relay, said control relay being adapted to remain energized until said storage relay is energized, a capacitor in circuit with said rejecting relay and adapted to be charged responsive to said storage relay, a release detecting arm responsive to a defective article passing thereby to cause said capacitor to release its charge to energize said rejecting relay and close its normally open contact and to close the circuit between the rejecting means and the source of power thereby energizing the rejecting means to reject a defective article said releasing means being in advance of said first mentioned detecting arm in the direction of said article path.

10. A defective article detecting mechanism comprising at least one detecting arm for detecting defective articles, means for rejecting defective articles, said rejecting means being in circuit with a source of electric power, a rejecting relay having a contact in circuit with said rejecting means, said contact being normally open to interrupt said circuit, means for moving articles in a path past said detecting arm to permit defective articles past said detecting arm to actuate said detecting arm, a control relay adapted to be energized by said detecting arm, a storage relay adapted to be energized by said control relay, said control relay being adapted to remain energized until said storage relay is energized, a capacitor in circuit with said rejecting relay and adapted to be charged responsive to said storage relay, a release detecting arm responsive to a defective article passing thereby to cause said capacitor to release its charge to energize said rejecting relay and close its normally open contact and to close the circuit between the rejecting means and the source of power thereby energizing the rejecting means to reject a defective article, said storage relay being adapted to remain energized until said rejecting relay is energized, said release detecting arm being in advance of said first mentioned detecting arm in the direction of said article path.

11. A defective article detecting mechanism comprising at least one detecting arm for detecting defective articles, means for rejecting defective articles, said rejecting means being in circuit with a source of electric power, a rejecting relay having a contact in circuit with said rejecting means, said contact being normally open to interrupt said circuit, means for moving articles in a path past said detecting arm to permit defective articles to actuate said detecting arm, a control relay adapted to be energized by said detecting arm, a storage relay adapted to be energized by said control relay, said control relay being adapted to remain energized until said storage relay is energized, a capacitor in circuit with said rejecting relay and adapted to be charged responsive to said storage relay, a release detecting arm responsive to a defective article passing thereby to cause said capacitor to release its charge to energize said rejecting relay and close its normally open contact and to close the circuit between the rejecting means and the source of power thereby energizing the rejecting means to reject a defective article, said storage relay being adapted to remain energized by said rejecting relay until said rejecting relay is energized, said release detecting arm being in advance of said first mentioned detecting arm in the direction of said article path.

12. A defective article detecting mechanism comprising top and side detecting arms for detecting defective articles, means for rejecting defective articles, said rejecting means being in circuit with a source of electric power, a rejecting relay having a contact in circuit with said rejecting means, said contact being normally open to interrupt said circuit, means for moving articles in a path past said detecting arm to permit defective articles to actuate said detecting arm, a control relay adapted to be energized by said detecting arm, a storage relay adapted to be energized by said control relay, said control relay being adapted to remain energized until said storage relay is energized, a capacitor in circuit with said rejecting relay and adapted to be charged responsive to said storage relay, a release detecting arm responsive to a defective article passing thereby to cause said capacitor to release its charge to energize said rejecting relay and close its normally open contact and to close the circuit between the rejecting means and the source of power thereby energizing the rejecting means to reject a defective article, said storage relay being adapted to remain energized by said rejecting relay until said rejecting relay is energized, said release detecting arm being in advance of said first mentioned detecting arm in the direction of said article path.

13. A defective article detecting mechanism comprising top and side detecting arms for detecting defective articles, means for rejecting defective articles, said rejecting means being in circuit with a source of electric power, a rejecting relay having a contact in circuit with said rejecting means, said contact being normally open to interrupt said circuit, means for moving articles in a path past said detecting arm to permit defective articles to actuate said detecting arms, a cam rail to act as a guide for said articles, a control relay adapted to be energized by said detecting arms in a tight line, a storage relay adapted to be energized by said control relay, said control relay being adapted to remain energized until said storage relay is energized, a capacitor in circuit with said rejecting relay and adapted to be charged responsive to said storage relay, a release detecting arm responsive to a defective article passing thereby to cause said capacitor to release its charge to energize said rejecting relay and close its normally open contact and to close the circuit between the rejecting means and the source of power thereby energizing the rejecting means to reject a defective article, said storage relay being adapted to remain energized by said rejecting relay until said rejecting relay is energized, said release detecting arm being in advance of said first mentioned detecting arm in the direction of said article path.

References Cited by the Examiner

UNITED STATES PATENTS

| | | | |
|---|---|---|---|
| 2,685,052 | 7/54 | Boyer | 317—139 |
| 2,689,647 | 9/54 | Hofstetter | 209—90 |
| 2,937,749 | 5/60 | Strzala | 209—88 |
| 3,064,807 | 11/62 | Stover | 209—82 X |

ROBERT B. REEVES, *Acting Primary Examiner.*

UNITED STATES PATENT OFFICE
CERTIFICATE OF CORRECTION

Patent No. 3,206,025　　　　　　　　　　　　September 14, 1965

Charles S. Ochs

It is hereby certified that error appears in the above numbered patent requiring correction and that the said Letters Patent should read as corrected below.

Column 6, line 25, strike out "in a path" and insert the same after "articles" in line 26, same column 6.

Signed and sealed this 20th day of September 1966.

(SEAL)
Attest:

ERNEST W. SWIDER　　　　　　　　　　　　EDWARD J. BRENNER
Attesting Officer　　　　　　　　　　　　　Commissioner of Patents